United States Patent [19]
Neri

[11] Patent Number: 4,641,024
[45] Date of Patent: Feb. 3, 1987

[54] CONVEYOR SYSTEM FOR TRANSFERRING A MASS OF BAR SHAPED ARTICLES, IN PARTICULAR CIGARETTES

[75] Inventor: Armando Neri, Bologna, Italy
[73] Assignee: G. D. Societa per Azioni, Bologna, Italy
[21] Appl. No.: 582,733
[22] Filed: Feb. 23, 1984
[30] Foreign Application Priority Data
  Feb. 24, 1983 [IT] Italy .................... 3350 A/83
[51] Int. Cl.⁴ ............................................. G01N 9/04
[52] U.S. Cl. ............................ 250/223 R; 250/222.1
[58] Field of Search ............ 250/223 R, 222.1, 231 R; 209/535, 536; 198/347

[56] References Cited
U.S. PATENT DOCUMENTS

| | | | |
|---|---|---|---|
| 3,961,185 | 10/1985 | Brokenshire et al. | 250/231 R |
| 3,993,194 | 10/1985 | Realand | 209/535 |
| 4,254,858 | 3/1981 | Seragnoli | 198/347 |
| 4,391,362 | 10/1985 | Spinelli | 250/223 R |
| 4,396,835 | 8/1983 | Seragnoli | 250/223 R |

FOREIGN PATENT DOCUMENTS

| | | |
|---|---|---|
| 1005751 | 9/1965 | United Kingdom . |
| 1372148 | 4/1972 | United Kingdom . |
| 1487394 | 3/1974 | United Kingdom . |
| 1597371 | 2/1977 | United Kingdom . |
| 2094007 | 9/1982 | United Kingdom . |
| 2124174 | 2/1984 | United Kingdom . |

Primary Examiner—David C. Nelms
Assistant Examiner—L. W. Madoo
Attorney, Agent, or Firm—Cushman, Darby & Cushman

[57] ABSTRACT

In a conveyor system for conveying articles, such as a system for conveying cigarettes from a cigarette-manufacturing machine along a plurality of channels to a packaging machine, the level of cigarettes in one or more of the channels is measured by an analog-type level detector which generates a continuous output signal used to continuously control the speed of the conveyor system.

7 Claims, 4 Drawing Figures

CONVEYOR SYSTEM FOR TRANSFERRING A MASS OF BAR SHAPED ARTICLES, IN PARTICULAR CIGARETTES

BACKGROUND OF THE INVENTION

The invention relates to a conveyor system for transferring a mass of bar shaped articles, in particular cigarettes, and more precisely to the conveyors that directly link one or more cigarette making machines to one or more cigarette packing machines.

DESCRIPTION OF THE PRIOR ART

In the said conveyor systems, the known practice is for the means that support and displace the cigarettes to be constituted by ribbons or belts that jointly define a number of channels along which the cigarettes, placed horizontally and amassed one against the other, are displaced with constant motion in the direction crosswise to the longitudinal axes thereof.

The said channels, which follow paths generally comprising horizontal, vertical, curved and sometimes inclined sections, run from the cigarette making machines into vertical channels or passages whose lower part is delimited by hoppers for supplying corresponding packing machines.

One condition for the satisfactory operation of the conveyor system and, consequently, of the entire plant, is that the quantity of cigarettes present at each moment in the said channels be such as to prevent the packing machines from being discontinuously supplied, and the cigarettes, above all in the downward sections of the conveyors, from being disarranged.

A further satisfactory operation condition is that pressures such as to cause the cigarettes to get blocked and suffer damage do not occur inside the mass of cigarettes flowing along the said channels.

For a continuous check on the said conditions, known conveyor systems comprise, along the path of the said channels, checking or detecting devices sensitive to a variation in the quantity of cigarettes caused, for example, by a difference in the output speeds of the cigarette making machines and the packing machines, or by the said machines having different performances or by faults on the said conveyor system.

The said checking devices are positioned at critical points on the conveyor system and they have the task of regulating the speeds of the said belt conveyors and, possibly, of causing the operation of magazines with which to compensate production imbalances between the machines in the plant.

Known is a checking device of the said type, described in U.S. Pat. No. 4,396,835, which comprises a plurality of photoemissive elements placed at different levels, the rays of which are directed, across the controlled position, at corresponding photo sensitive elements. An electric circuit attends to operating the conveyor drive system, the voltage being dependent on the absolute value and the sign of the number of photo sensitive elements illuminated.

With a device of this type, however, various problems occur. In the first place, it is electrically complex and the cost is considerable. Furthermore, it requires cumbersome structures for supporting the numerous photoelectric elements present and does not lend itself to being installed at placed in the plant where there is a shortage of available space. Lastly, despite use being made of a large number of photoelectric detection elements, the output signal of the said device tends to be stepped and this does not allow the regulation of the system to be highly precise.

SUMMARY OF THE INVENTION

The object of the invention is to make available a checking device of the above described type that is able to overcome all the difficulties mentioned in respect of the known art.

The above mentioned object is attained with the conveyor system according to the invention for transferring a mass of bar shaped articles, in particular cigarettes, arranged horizontally and one parallel with the other, from one or more machines on which the said articles are made to one or more machines for packing the said articles, provided with conveyor means for supporting and transferring the said articles with a movement crosswise to the axes thereof, these defining a number of channels connected one to the other; and at least one device for checking or detecting the quantity of the said articles at a given position of the said conveyor system, called the checking position, for operating the corresponding drive means of the said conveyors, an essential feature of the said conveyor system being that the said checking device comprises a transducer of analog type that furnishes an output signal whereby the level trend of the said articles in the said checking position is reproduced.

BRIEF DESCRIPTION OF THE DRAWINGS

Further characteristics and advantages of the invention will emerge from the description that follows, with reference to the accompanying drawings, in which are given purely as unlimited examples, certain embodiments, and in which.

DESCRIPTION OF THE PREFERRED EMBODIMENT

Figure 1:
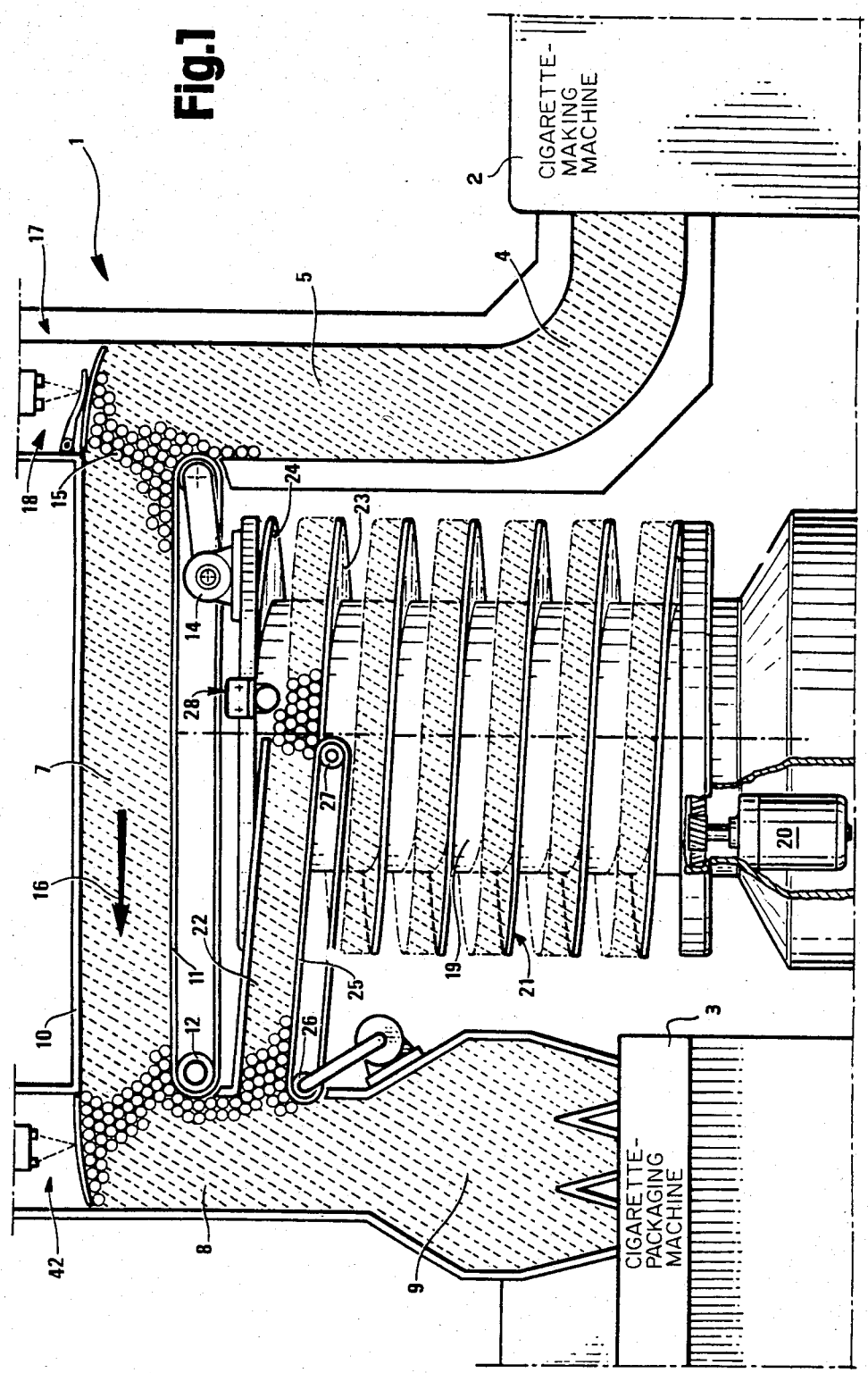
FIG. 1 shows, diagrammatically, a conveyor system for linking a cigarette making machine to a packing machine.

In FIG. 1 is shown a transportation line 1 that extends between a cigarette making plant and a packing plant, the former constituted by a cigarette making machine 2 and the latter by a packing machine 3. The transportation line 1 can naturally be used to link, one to the other, a number of cigarette making machines 2 and packing machines 3.

Commencing at the machine 2, the transportation line 1 is constituted by a curved channel 4 followed by a vertical channel 5. The said channels 4 and 5 are defined by the opposite ribbons or belts of the conveyors 6.

The upper extremity of the channel 5 terminates at a virtually horizontal channel 7, the other extremity of which communicates with the upper extremity of a second virtually horizontal channel or passage 8 whose lower part runs into the inside of an entrance hopper 9 of the machine 3.

In particular, the channel 7 is delimited at the top by a fixed wall 10, and at the bottom by a belt conveyor 11 mounted around the rollers 12 and 13, the latter being carried in rotation by a motor 14.

The channels 4, 5, 7 and 8 are occupied by a mass of cigarettes 15 produced on the machine 2, placed crosswise to the major axes of the said channels. The cigarettes 15 are made to move forward along the channel 7, towards the upper extremity of the passage 8, in the direction shown by an arrow 16.

In the region of the area where the vertical channel 5 joins the horizontal channel 7, called the checking position 17, a checking device shown in its entirety at 18 is provided.

The passage 8 communicates, on one side, with a magazine 19 for compensating imbalances, of the type described, for example, in U.S. Pat. No. 4,254,858 in the name of the same Applicant as herein.

In accordance with the known practice, the said magazine 19 is constituted by a vertical axis cylindrical body, around which is spirally wound, in a way whereby it is able to slide in the two directions under the action of a motor 20, a thin plate 21 for supporting a layer of cigarettes 15 of virtually a uniform thickness.

The magazine 19 is connected to the passage 8 via a duct 22 that runs into the space in between the two spires 23 and 24 of the said thin plate 21. The underneath part of the said duct 22 is defined by a belt 25 wound endlessly around extremity rollers 26 and 27, one of which at least is driven.

At a point corresponding to the entry area of the magazine 19 a checking device, shown in its entirety at 28, is provided.

The said checking device 18 (see FIG. 2) comprises a diaphragm element 29 that rests on the cigarettes 15 in the area of confluence of the channel 5 and the channel 7, and has one extremity secured to the wall 10. The said diaphragm element 29, made for example of metal mesh, is of a density such as to exert a stabilizing action on the cigarettes 15 underneath but nevertheless is able to "feel" variations in the level of these.

In the region of the central area of the diaphragm element 29, resting thereon is a lever element 30, one extremity of which is pivotally connected to a wall 31 integral with the wall 10.

Figure 4:
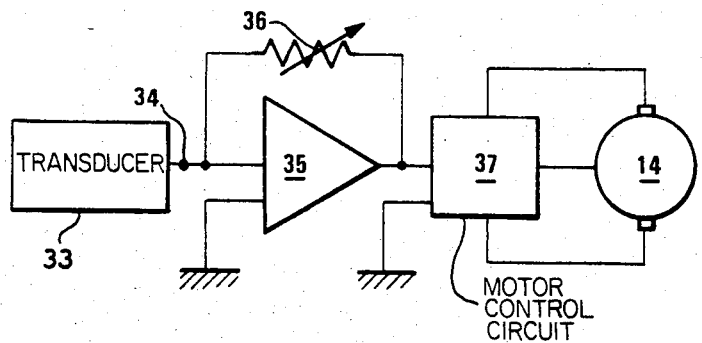
FIG. 4 shows, diagrammatically, an electric circuit belonging to the conveyor system according to the invention.

Above the lever element 30, the wall 31 supports, by means of a bracket 32, an analog transducer 33, that is to say, a transducer able to detect variations in the level of the lever element 30 and, therefore, of the cigarettes 15, inside the channel 5, and to provide, for each position adopted by the said element 30, a corresponding signal to an output 34 (see also FIG. 4).

Figure 2:
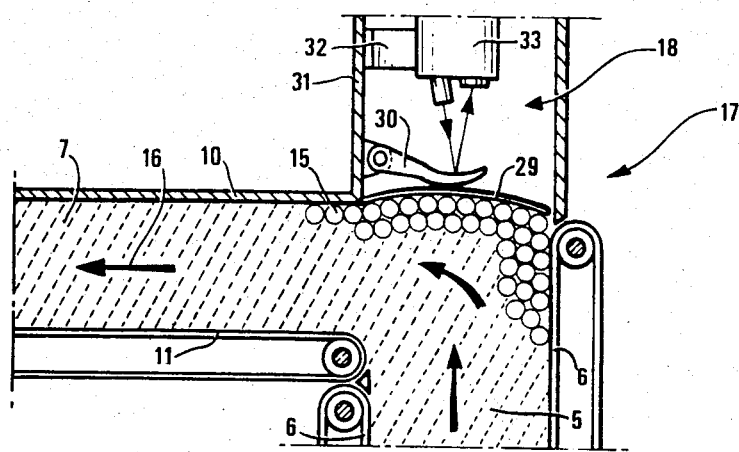
FIGS. 2 and 3 show, in a larger scale, two details of FIG. 1.
Figure 3:
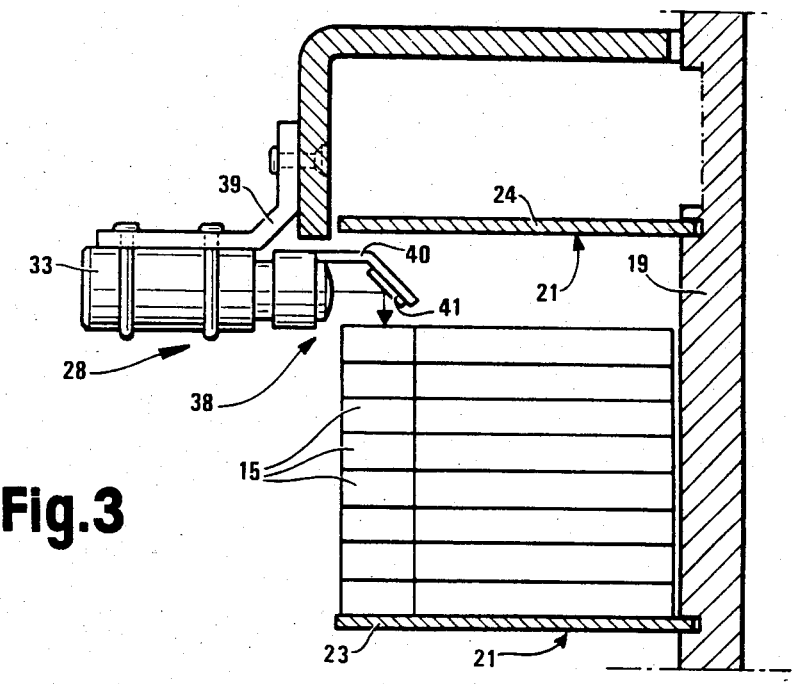

In FIGS. 2 and 3, the said transducer 33, of photoelectric type, directs a luminous ray towards the lever element 30, receives the ray reflected back by this and supplies the output 34 with a signal of a voltage proportional to the intensity of the said ray.

With reference also to FIG. 4, the output signal of the transducer 33 arrives at the input of an operational amplifier 35 whose gain can be regulated through a negative feedback resistor 36.

Present at the output of the operational amplifier 35 is a signal for operating a circuit 37 of a known type, which attends to regulating the speed of the motor 14 of the conveyor 11.

The checking device 28 (see FIG. 3) constitutes a variation to the checking device 18 that is able to be installed in the particularly limited space, called the checking position 38, delimited by the two spires 23 and 24.

In the latter instance, the transducer 33 carried, by means of a bracket 39, by the frame of the magazine 19, directs the luminous ray parallel to the axes of the cigarettes 15 supported by the spire 23. A plate 40 integral with the body of the transducer 33 carries on the free extremity thereof, angled downwards through 45°, a reflecting element 41 turned towards the cigarettes 15. The said reflecting element 41 attends to the sending back towards the transducer 33 of the reflected ray.

The output signal of the said transducer 33, fed to a circuit of the type described previously with reference to FIG. 4, looks after the regulating of the speed of the motor 20 of the magazine 19.

The conveyor system according to the invention, in which the checking devices described are utilized, offers several advantages.

Firstly, the regulation signal emitted by the described devices 18 and 28 is of analog type whereby every possible level condition of the cigarettes in the checking areas is faithfully reproduced, unlike what occurs with the devices to which reference was made in the introductory part of this text, which furnish output signals that tend to be stepped. As a result of this, the speed of the conveyors in the plant is regulated from one moment to the other with the maximum precision.

Furthermore, the reduced dimension of the checking devices 18 and 28 enable them to be installed even in areas of the plant where because of their excessive volume, there is not sufficient space for the devices of a known type.

It should also be noted that in comparison with the electric circuits utilized in the known devices, the electric circuit connected to the checking devices 18 and 28 described herein is extremely simple and economical.

Naturally, leaving unchanged the principles of the invention, the variants it would be possible to make to the described conveyor system, without because of them in any way deviating from the framework of the invention, are numerous.

For example, the transducer 33 could be constituted by a transducer of capacitive or inductive type, instead of photoelectric.

In the preceding description, the installation points considered for the checking devices 18 and 28 have been limited to two though, obviously, any "critical" position in the plant can, in practice, be subjected to a check on the part of devices of the type described.

In particular, a checking device 42 similar to the device 18 is placed at the upper extremity of the passage 8 in order to verify the level of the cigarettes 15 there inside and to regulate, through the output signal thereof, additional drive means belonging to the conveyor system in question.

As can be seen in FIG. 1, the said lever element 30 is omitted from the said device 42, and the analog transducer directs its ray directly towards the diaphragm element 29.

What is claimed is:

1. Conveyor system for transferring a mass of bar shaped articles having longitudinal axes, in particular cigarettes, arranged horizontally and one parallel with the other, from at least one machine on which the articles are made to at least one more machine for packing the articles, provided with conveyor means for supporting and transferring the articles with a movement crosswise to the longitudinal axes thereof, said conveyor means defining a plurality of channels connected one to the other; and at least one device for checking or detecting the quantity of the articles at a given position of said conveyor system, called the checking position, for operating the corresponding drive means of said conveyors, an essential feature of the said conveyor system being that said checking device comprises a transducer of analog type that furnishes an output signal whereby the level trend of the articles in the checking position is checked, said output signal proportional to the distance between the transducer and the surface of the level trend of the said articles at the said checking position.

2. Conveyor system according to claim 1, wherein the said transducer is of photoelectric type and wherein said transducer is positioned above said checking position in such a way as to direct, in a virtually vertical direction, a ray towards the articles.

3. Conveyor system according to claim 2, wherein at least one reflecting element is interposed between said transducer and said checking position.

4. Conveyor system according to claim 3, provided with an imbalance compensating magazine which includes a plurality of superposed spiral plates for supporting the articles and wherein said reflecting element is interposed between the upper spiral plate of two contiguous spiral plates of said magazine and the maximum level of the articles supported by the lower spiral plate.

5. Conveyor system according to claim 1, wherein said transducer is of capacitive type.

6. Conveyor system according to claim 1, wherein said transducer is of inductive type.

7. A conveyor system for transferring a plurality of elongated articles having longitudinal axes arranged horizontally and parallel to each other comprising: conveyor means for supporting and transferring the horizontal articles in directions perpendicular to their longitudinal axes within channels connected to each other; drive means for the conveyor means; means for detecting the level of the articles in a channel at a given location comprising a transducer of analog type, said transducer directing an energy beam onto the upper surface of the articles at said location in a generally perpendicular direction and receiving a reflected generally vertical energy beam whereby the directions of the beam are generally parallel to the direction of vertical movement of the articles as the level of the articles changes, said transducer furnishing an output signal which is proportional to the intensity of the reflected beam and which indicates the distance between the upper surface of the articles and the transducer; and circuit means for controlling the speed of the conveyor drive means in accordance with the transducer output signal.

* * * * *